United States Patent Office 3,257,341
Patented June 21, 1966

3,257,341
DISPERSION POLYMERIZATION OF MONOMER IN PRESENCE OF MERCAPTAN ADDED DURING POLYMERIZATION
Desmond Wilfrid John Osmond, Iver Heath, England, assignor to Imperial Chemical Industries Limited, Millbank, London, England, a corporation of Great Britain
No Drawing. Filed May 1, 1961, Ser. No. 106,528
Claims priority, application Great Britain, May 4, 1960, 15,832/60
9 Claims. (Cl. 260—4)

This is a continuation-in-part of earlier application Ser. No. 848,923, filed October 27, 1959, now abandoned.

This invention relates to the manufacture of dispersions of synthetic polymer in organic liquid.

It has previously been found that stable dispersions of polar synthetic polymers can be provided in relatively non-polar organic liquid, the dispersion being stabilized by block or graft copolymer of which one constituent is compatible with the polymer and incorporated in the disperse polymer particles and another is solvated by the organic liquid. Incorporation of the block or graft copolymer in the disperse particles results in the stabilizing solvated constituent being firmly and irreversibly attached to the particles by the primary chemical bonds of the block or graft copolymer. This is in contrast to the use of conventional stabilizing agents in which the stabilizing solvatable groups become indirectly attached to the disperse particles through groups which themselves are merely adsorbed on to the surface of the disperse particles by second order forces.

One method of making such dispersions is by coprecipitating the polymer and the block or graft copolymer in the organic liquid, the polymer and copolymer being formed in situ by polymerizing monomer and copolymerizable solvated constituent in the organic liquid in which the resulting polymer is to be dispersed. Polymerization of the mixture results in the formation of polymer and of a block or graft copolymer of the solvated constituent and part of the monomer, the polymer and copolymer being co-precipitated as they are formed to produce a stable dispersion in the organic liquid.

Where the block or graft copolymer is formed in situ by copolymerization of a solvated constituent with part of the monomer the rate of formation of the graft should not be grossly out of balance with the rate of formation of the polymer with which it is being precipitated; if the grafting reaction is carried to excess it will result in cross-linking of the solvated constituent in the organic liquid causing thickening or even gelation of the whole continuous phase.

It is desirable for some purposes, e.g. where the dispersion is to be used in coating compositions, to produce a dispersion of fine particle size, e.g. of average size $0.5\mu$, no particles being greater than $1.0\mu$, and yet of high solids content, e.g. at least 40% by weight.

For a given polymer, the particle size of the dispersion is largely dependent on the proportion of block or graft copolymer present during the precipitation of the disperse particles of polymer, the higher the proportion of block or graft copolymer, the finer being the dispersion. In a process in which all the ingredients are added at the commencement of the process it is difficult to build up an initial concentration of block or graft copolymer high enough to produce a dispersion of fine particle size and high solids content without continuing, during the remainder of the reaction, to generate block or graft copolymers at such a high rate as to give rise to danger of thickening or gelling the continuous phase.

In my co-pending application (equivalent to British patent application 15,830/60) No. 106,501, filed May 1, 1961, I have described how generation of the block or graft copolymer may be controlled by the use of an organic chain transfer agent or retarder which can render free radicals in the solvated constituent or in the block or graft copolymer incapable of reacting with monomer. Such compounds are referred to hereinafter as scavengers.

According to the present invention I provide an improvement in the invention of application (equivalent to British patent application 15,830/60) No. 106,501, filed May 1, 1961, in that a dispersion of polar synthetic polymer in relatively non-polar organic liquid is made by polymerizing monomer in solution in the organic liquid in the presence in solution of a solvated constituent which will form a block or graft copolymer with part of the monomer, the solvated constituent and a minor proportion of the monomer being reacted at the beginning of the polymerization and the remainder of the monomer and a scavenger (as defined) being added after substantially all the minor proportion of monomer has been reacted.

In this way the first stage of the reaction is directed mainly to building up such a concentration of block or graft copolymer as will cause polymer to be precipitated in fine particles, the concentration of monomer being restricted so as to reduce to a minimum the formation of such polymer during that stage. In the second stage, the relative rate of production and precipitation of polymer is increased by raising the monomer concentration and at the same time the absolute rate of block or graft copolymer production is reduced by the addition of the scavenger, preferably to such a level as will merely replace that lost from solution by incorporation in the precipitated polymer particles.

The minor proportion of monomer added at the first stage should be at least equal to the weight of solvated constituent. Since, in the process of this invention, the solvated constituent is used more efficiently than in a normal batch process, a suitable proportion of solvated constituent is from 1–2.5% by weight of total monomer. The minor proportion of monomer should, however, not exceed 25% of the total monomer and preferably is in the range 5–15% of the total monomer. Using a proportion in this preferred range makes it possible to add the remainder of the monomer in the second stage without having first to cool the batch.

The process of this invention is particularly applicable to the preparation of dispersions of acrylate polymers, by which I mean polymers and copolymers comprising acrylic or methacrylic acid or an ester, amide or nitrile of such an acid. Typical materials which are suitable as monomers in this invention include acrylonitrile, acrylates and methacrylates of aliphatic alcohols such as ethyl, octyl, lauryl and natural fat alcohols. The preferred monomers for use in the production of polymers for the preparation of coating compositions by this process are methyl methacrylate, $\beta$-ethoxy ethyl methacrylate, ethyl acrylate, acryonitrile methacrylic acid and acrylic acid, and amides of these acids. Combinations of the above monomers may be used and other typical materials which are suitable for use as comonomers include dimethyl itaconate, diethyl maleate and maleic anhydride.

These types of polymers are suitably dispersed in non-polar liquids such as aliphatic hydrocarbons and long chain alcohols and ketones. As solvated constituent of the block or graft copolymer natural rubber, preferably degraded, liquid polybutadiene or other copolymerizable constituent solvated by the liquid may be used.

Typical scavengers for use in the preparation of such dispersions include alkyl mercaptans, e.g. octyl and lauryl mercaptans, allyl compounds, e.g. allyl alcohol, and terpene derivatives, e.g. alloocimene, myrcene and dipentene.

The dispersions made by the process of the present invention may be used as the basis of coating compositions, plasticizer for the polymer and disperse pigment being incorporated as and how required by known methods.

To illustrate the invention three basically similar polymer dispersions were prepared to the following recipes in which all parts are by weight:

| | Batch A | Batch B | Batch C |
|---|---|---|---|
| Charge: | | | |
| Methyl methacrylate | 1,000 | 1,000 | 100. |
| 60–80° petroleum | 590 | 590 | 590. |
| White spirit | 400 | 400 | 400. |
| Benzoyl peroxide | 1 | 2 | 2. |
| Primary octyl mercaptan | | 5 | |
| Degraded rubber (molecular weight 30,000 approximately). | 22.5 | 22.5 | 22.5 |
| Feed: | | | |
| Methyl methacrylate | | | 900. |
| Primary octyl mercaptan | | | 5. |
| Type | Simple batch process without scavenger. | Simple batch process with scavenger. | Two-stage process with scavenger. |
| Result | Thick, near-gelled dispersion of moderate particle size, about 0.5μ.* | Thin, fluid dispersion containing many coarse particles, >1.0μ.* | Thin fluid dispersion with fine particles, none >0.6μ.* |

*Particle size from electron micrograph.

The apparatus used in each case was a 3 liter glass reactor equipped with a heating and cooling jacket, batch thermometer, stirrer, sample line and reflux condenser.

In Batches A and B the whole charge was placed in the reactor, raised to a reflux temperature of approximately 80° C. and maintained at that temperature until the analysis of samples drawn from the batch indicated that conversion was substantially complete. This took approximately two hours for Batch A and three hours for Batch B.

In Batch C the ingredients listed under "Charge" were placed in the reactor, raised to a reflux temperature of approximately 80° C. and reacted until most of the monomer had been consumed. This took approximately 1¼ hours. The batch was then cooled to 70° C., i.e. below the reflux temperature, to arrest further reaction and the ingredients listed under "Feed" poured slowly into the reactor. The temperature was again raised to reflux and the batch reacted until all the monomer had been consumed. This took approximately 2½ hours after again reaching reflux.

The product of Batch C was ideally suited for use in a coating composition. A pigment paste was made by dispersing 30 parts of rutile titanium dioxide in 15 parts dibutyl phthalate and 30 parts mineral spirits using 1 part of a 60% solids solution of a rosin-modified long oil alkyl resin as a dispersing agent. To this paste were added 100 parts of the product of Batch C together with 10 parts dibutyl phthalate, 20 parts of low-boiling petroleum ether and 1 part of a 10% solution of liquid polysiloxane. The composition was thoroughly stirred, filtered and spray-applied to glass panels. The coated panels were allowed to stand for 5 minutes and then heated to 127° C. for half an hour. An extremely hard, tough, mar-resistant film which could be polished to a very high gloss was obtained.

What I claim is:

1. In a process for producing a stable dispersion of a solid polar addition polymer in an inert relatively non-polar organic liquid in which the polymer is insoluble which comprises polymerizing at least one ethylenically unsaturated monomer which is polymerizable by addition polymerization in said organic liquid in the presence of a catalyst for the polymerization of said monomer and a copolymerizable polymeric solvated constituent which is solvatable by said organic liquid and forms a member of the group consisting of block and graft copolymers with part of said ethylenically unsaturated monomer, to form a stable dispersion of solid polymer in organic liquid; the improvement which comprises carrying out the polymerization by first mixing a minor proportion of the monomer with said solvated constituent, and, after they have copolymerized, mixing with the resultant initial product, the remainder of the monomer to be polymerized and an alkyl mercaptan which reduces the tendency of said solvated constituent to react with said monomer, and completing the polymerization, the minor proportion of monomer being at least equal in weight to said polymeric solvated constituent but not more than 25% of the total monomer.

2. An improved process as set forth in claim 1 in which said polymeric solvated constituent is rubber.

3. An improved process as claimed in claim 1 in which the minor proportion is from 5–15% of the total monomer.

4. An improved process as claimed in claim 1 in which the polymeric solvated constituent is used in a proportion of from 1 to 2.5% by weight of the total monomer.

5. An improved process as set forth in claim 1 in which the monomer is a member of the group consisting of acrylic acid, methacrylic acid and the lower esters, amides and nitriles thereof.

6. An improved process as set forth in claim 5 in which the monomer is methyl methacrylate.

7. A polymer dispersion made by a process claimed in claim 1.

8. A coating composition comprising a polymer dispersion as claimed in claim 7, a plasticizer for the polymer and a dispersed pigment.

9. An article which has been coated with a composition as claimed in claim 8.

References Cited by the Examiner

UNITED STATES PATENTS

| 2,561,951 | 7/1951 | Roberts et al. | 260—33.6 |
| 2,656,297 | 10/1953 | Davis et al. | 260—33.6 |
| 2,744,085 | 5/1956 | Hubbard | 260—33.6 |
| 2,753,287 | 7/1956 | Thomson | 260—33.6 |
| 2,820,773 | 1/1958 | Childers et al. | 260—879 |
| 2,843,561 | 7/1958 | Ingley et al. | 260—33.6 |
| 2,888,442 | 5/1959 | Uraneck et al. | 260—33.6 |
| 2,946,702 | 7/1960 | Bach | 260—33.6 |
| 2,966,474 | 12/1960 | Jurgeleit | 260—33.6 |
| 3,095,388 | 6/1963 | Osmond et al. | 260—4 |

FOREIGN PATENTS 554,596    3/1958    Canada.

OTHER REFERENCES

Hayes: Jour. Polymer Science, vol. XI, No. 6, pp. 531–537, December 1953.

MURRAY TILLMAN, *Primary Examiner.*

LEON J. BERCOVITZ, WILLIAM H. SHORT,
*Examiners.*

J. W. SANNER, G. F. LESMES, *Assistant Examiners.*